Jan. 2, 1951 — O. R. GRUBE — 2,536,279
HOLDER FOR GRINDING LATHE TOOL BITS
Filed Oct. 2, 1947

INVENTOR.
Otto R. Grube
Victor J. Evans & Co.
ATTORNEYS

Patented Jan. 2, 1951

2,536,279

UNITED STATES PATENT OFFICE 2,536,279

HOLDER FOR GRINDING LATHE TOOL BITS

Otto R. Grube, Egg Harbor City, N. J.

Application October 2, 1947, Serial No. 777,471

1 Claim. (Cl. 51—218)

This invention relates to a holder grip for use in grinding lathe tool bits.

It is an object of the present invention to provide a holder grip for tool bits whereby the same can be properly placed on the grinding wheel and without the mechanics' fingers being burned on the tool bit becoming heated during the grinding operation and wherein the tool bit can be attached to the holder with little effort.

Other objects of the present invention are to provide a holder grip for grinding tool bits, which is of simple construction, inexpensive to manufacture and convenient to use.

Figure 1:
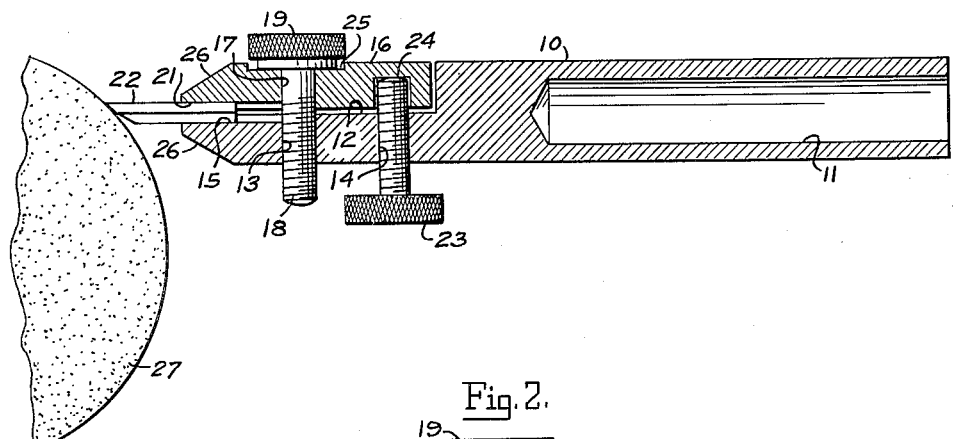
Figure 2:
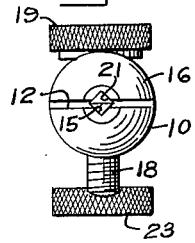
Figure 3:
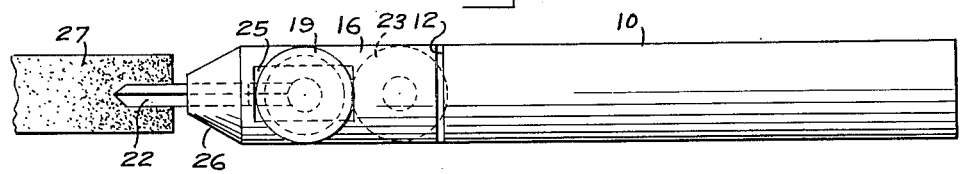

For a better understanding of the invention, reference may be had to the following detailed description taken in connection with the accompanying drawing, in which Fig. 1 is a longitudinal cross-sectional view taken through the holder with the tool bit engaging with a grinding wheel, Fig. 2 is a front end elevational view of the holder, Fig. 3 is a top plan view of the holder.

Referring now to the figures, 10 represents the main part of the holder comprising a round piece of stock having a lightening hole 11 in the hand grip end of the same. The part 10 is recessed or cut away as indicated at 12 and the bottom portion below the recess is provided with two threaded holes 13 and 14 longitudinally spaced from one another. In the end of the holder and in the top above the remaining portion there is cut a square or V-shaped groove 15 for receiving the tool bit. Over the top of the portion there is placed a clamping plate 16 having a hole 17 therein for receiving a clamping screw 18 with a knurled knob 19 thereon. This clamping plate 16 has a complementary groove of V-shape as indicated at 21 for receiving tool bit 22. As the screw 18 is tightened into the threaded hole 13 the plate 16 is brought tightly onto the tool bit.

In order to prevent the plate 16 from turning or twisting, a set screw 23 is extended through the threaded hole 14 and into a closed hole 24. The plate 16 may be relieved at 25 to receive a portion of the knob 19 of the screw 18. The forward portions of the plate 16 and of the main part 10 are tapered as indicated at 26. The tool bit 22 can be easily accommodated within the grooves 15 and 21 and by the provision of the taper 26 a sharpening of a tool bit of very short length can be effected upon a grinding wheel 27.

While various changes may be made in the detail construction, it shall be understood that such changes shall be within the spirit and scope of the present invention as defined by the appended claim.

I claim:

In a holder for grinding a tool bit having a tubular main part provided with a cut-away portion on its forward end, the improvement comprising a centrally located groove extending longitudinally of the cut-away portion in the top of the main part to receive the tool bit, a plate having a centrally located groove in the bottom thereof which is adapted to be alined with the groove in the main part to receive the tool bit, and said plate adapted to be received in the cut-away portion of the main part, two longitudinally spaced threaded bores extending through said main part into the cut-away portion thereof, an open bore and a closed bore longitudinally spaced with relation to each other in said plate and said open and closed bores are adapted to be alined with the threaded bores in the cut-away portion of said main part, a recess in said plate in the top thereof concentric with the open bore therein, a set screw having a knurled knob end adapted to be extended through the open bore in said plate and the threaded bore in the cut-away portion in alinement therewith, a second set screw having a knurled knob end adapted to be extended through the threaded bore in the main part into the closed bore in the plate, whereby said main part and said plate are fixed upon the tool bit and the plate is fixed from lateral twisting movement with relation to said main part and the forward end of the main part and the forward end of the plate being tapered or relieved to permit close approach of the holder to a grinding wheel for the grinding of a short tool bit.

OTTO R. GRUBE.

REFERENCES CITED

The following references are of record in the file of this patent:

UNITED STATES PATENTS

| Number | Name | Date |
|---|---|---|
| 91,312 | Dickinson | June 15, 1869 |
| 153,568 | Husbands | July 28, 1874 |
| 296,622 | Reno | Apr. 8, 1884 |
| 546,903 | Ryan | Sept. 24, 1895 |
| 798,688 | Marotzka | Sept. 5, 1905 |
| 930,695 | Royle | Aug. 10, 1909 |
| 1,039,831 | Sisson | Oct. 1, 1912 |